United States Patent [19]

Luitwieler, Jr.

[11] 4,049,966

[45] Sept. 20, 1977

[54] NUCLEAR RADIATION MEASURING METHOD AND APPARATUS HAVING BLANKING TIME INVERSELY RELATED TO COUNT RATE

[75] Inventor: Samuel H. Luitwieler, Jr., La Mirada, Calif.

[73] Assignee: Beckman Instruments, Inc., Fullerton, Calif.

[21] Appl. No.: 702,253

[22] Filed: July 2, 1976

[51] Int. Cl.² .................................................. G01T 1/20
[52] U.S. Cl. .................................. 250/369; 250/336; 250/366; 328/165
[58] Field of Search .................... 328/117, 162–167, 328/139, 99; 250/369, 336, 366

[56] References Cited

U.S. PATENT DOCUMENTS

| 2,681,989 | 6/1954 | Cunniff | 328/165 |
| 3,246,150 | 4/1966 | Stoddart et al. | 250/369 |
| 3,859,532 | 1/1975 | Luitwieler | 250/369 |

Primary Examiner—Harold A. Dixon
Attorney, Agent, or Firm—R. J. Steinmeyer; R. R. Meads; J. R. Shewmaker

[57] ABSTRACT

A method and apparatus for inhibiting measurement of nuclear radiation in a scintillation counter during periods of excessive background radioactivity produced, for example, by cosmic energy surges impinging on the scintillation counter. The count rate of a radioactive source or sample being measured is monitored and detector means are provided for detecting the occurrence of an energy surge exceeding a predetermined energy level. When a surge is detected, inhibit means inhibits counting for a time period which varies inversely with the count rate.

6 Claims, 3 Drawing Figures

NUCLEAR RADIATION MEASURING METHOD AND APPARATUS HAVING BLANKING TIME INVERSELY RELATED TO COUNT RATE

BACKGROUND OF THE INVENTION

1. Field of the Invention

The present invention relates generally to the measurement of nuclear radiation using scintillation counters and, more particularly, to a method and apparatus for inhibiting radiation measurement during periods of excessive background radioactivity.

2. Description of the Prior Art

Scintillation counting techniques have been widely adopted to measure the activity of materials containing radionuclides. A scintillation counter typically comprises a scintillator and a photomultiplier tube. When radioactive disintegrations of the radionuclide of interest interact with the scintillator, light flashes (scintillations) are produced. The scintillations are detected by the photomultiplier tube and converted into electrical pulses having pulse heights corresponding to the energy of the scintillation being detected. A scaler counts the pulses to provide a measure of the radioactivity.

The most commonly used radionuclides, particularly in clinical and diagnostic procedures such as radioimmunoassay (RIA), are radionuclides which emit beta or gamma radiation. Counters for gamma radiation typically employ a scintillator crystal such as thallium-activated sodium iodide. Counters for beta radiation, on the other hand, are increasingly incorporating liquid scintillation techniques. In a liquid scintillation counter, a radionuclide-containing sample and a scintillator solute (e.g. p-Terphenyl) are disposed within a liquid solvent (e.g. p-Xylene). It is theorized that most of the kinetic energy from the nuclear disintegrations of the sample is absorbed by the solvent and then transferred to the solute which emits photons as visible light flashes or scintillations.

In any scintillation counter, it is essential to distinguish legitimate pulses produced by a sample or source being measured from background or noise pulses produced by other sources. Background radiation or noise results from a variety of sources including: (1) thermal emission within the photomultiplier tubes, (2) radioactive disintegrations from the materials of which the scintillation counter is constructed, and (3) cosmic energy surges which impinge on the counter. It should be noted at this point that samples may be typically counted for a period ranging from a small fraction of a minute up to several hours. Depending on the nature of the sample, the count rate may vary from less than 10 counts per minute (cpm) to many thousands of counts per minute. It is evident that for low count rates, even a small number of background counts can substantially alter the total pulse count and thus introduce major inaccuracies in the resulting measurements.

In view of the above, considerable effort has been expended to reduce the effect of background radiation in scintillation counters. In one approach, coincidence counters have been developed in which a scintillation must be coincidentally detected by two photomultiplier tubes to be counted. In another approach, the samples being measured have been surrounded by heavy shielding material, usually lead, to shield the sample from outside radiation. Other techniques have been devised to measure or approximate the background pulses introduced by the electronics of the measuring system and to subtract this background value from each resulting measurement.

However, the above advances have not been completely successful in eliminating the inaccuracies introduced by overloading energy surges produced by cosmic or other sources of noise. Such overloading surges typically comprise a large energy pulse followed by a string of smaller satellite pulses. Typically, the large pulse greatly exceeds the energy range being detected by the instrument. However, the satellite pulses typically have pulse heights which fall within the energy range or window of legitimate pulses from the sample being measured. Moreover, the satellite pulses are high frequency pulses, and thus the chance rate of coincidence between the satellite pulses is many times higher than that between random noise pulses. As a result, coincident counters do not successfully discriminate against the satellite pulses. Even with heavy shielding, the sample cannot be completely isolated from the effects of cosmic energy surges. Moreover, cosmic energy surges are random in nature and may occur from several times a minute up to 60 times a minute or more. Because of this unpredictability, it is difficult to approximate an associated background count for subtraction from the actual count.

My U.S. Pat. No. 3,859,532, assigned to the assignee of the present invention, discloses one approach for reducing counting errors introduced by overloading radioactive disturbances. The apparatus in the patent detects the occurrence of an overloading energy surge and inhibits the measurement of radioactivity thereafter for a predetermined time interval, for example 1 millisecond, approximating the anticipated duration of the energy surge. Unfortunately, however, at high sample count rates, legitimate sample counts which occur during the inhibit interval are lost, thereby introducing inaccuracies into the measurement.

SUMMARY OF THE INVENTION

The present invention resides in a new and improved method and apparatus for automatically inhibiting measurement in scintillation counters in a manner which overcomes the disadvantages of the prior approaches. The apparatus of the invention is simple, inexpensive, and commercially practical in construction and is reliable in operation and use.

The scintillation counter of the invention, in its broader aspects, monitors the rate at which pulses from a sample being measured are produced and, upon detection of an overloading radiation surge, from cosmic or other sources, inhibits counting of pulses for a time period which varies inversely with the monitored pulse rate.

In the preferred embodiment, by way of example only, gating means controls the transfer of pulses between radiation detector means and pulse counting means. A variable inhibit circuit, responsive to the monitored pulse rate signal and to the detection of an overloading surge, provides a variable output signal which inhibits the gating means to prevent transfer of pulses to the counting means. The variable inhibit circuit comprises comparator means for comparing the sample pulse rate signal against a reference level and for providing an output signal indicative of the pulse rate. Timing means responds to the comparator output signal to produce the variable inhibit signal, the duration of which varies inversely with the pulse rate. The inhibit signal is coupled to the gating means for inhibiting the same.

The present invention minimizes the problems associated with prior art arrangements for dealing with overloading energy surges. In particular, it inhibits radiation measurement following an overloading surge for a time period which varies inversely with the pulse rate. Thus, at higher pulse rates the inhibit interval is less than at lower pulse rates. As a result, the inhibit interval is maximized for low pulse rates where background pulses introduce major inaccuracies. At higher pulse rates where the relative number of background pulses is substantially less than the number of legitimate pulses, the shorter inhibit interval prevents the loss of legitimate pulses.

Other aspects and advantages of the invention will be apparent from the following detailed description taken in conjunction with the accompanying drawing.

DESCRIPTION OF THE PREFERRED EMBODIMENT

Figure 1:
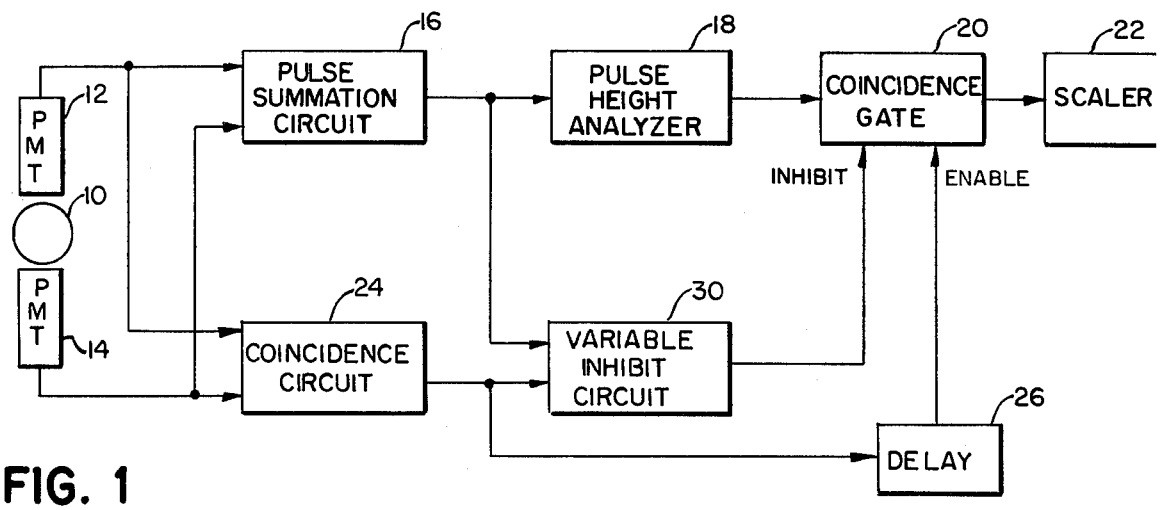
FIG. 1 is a block diagram illustrating the inhibit circuit of the invention as incorporated in a coincident counting radiation analyzer.

As shown in the drawing for purposes of illustration, the present invention is embodied in a scintillation counting arrangement for measuring the radioactivity of a sample indicated generally by numeral 10. The arrangement is illustrated for the coincident counting of nuclear disintegrations of the sample. In liquid scintillation counting, the sample 10 comprises a vial disposed within a shielded counting chamber and containing the liquid scintillation sample. A pair of photomultiplier tubes 12 and 14 detect the scintillations resulting from the sample disintegrations and produce output pulses having pulse heights corresponding to the energy of the detected scintillation. The scintillations will be detected by both tubes thereby producing a pair of coincident output pulses for each scintillation. Random noise in the scintillation counter will usually produce output pulses from the photomultiplier tubes which are not in coincidence and which will therefore be rejected by the system and not counted.

The output of each photomultiplier tube is coupled as input to a pulse summation circuit 16 which prepares the pulses for analysis by pulse height analyzer 18. Generally, coincident pulses are summed by summation circuit 16 while non-coincident pulses are transmitted unchanged. The pulse height analyzer 18 selects pulses within a predetermined energy range or window for measurement. The upper and lower limits of the energy window are set and the pulse height analyzer passes only those pulses falling within the window for transfer through coincidence gate 20 to a scaler 22 for counting.

The output of each photomultiplier tube 12 and 14 is also coupled as an input to a coincidence circuit 24 which provides a single output pulse for each input pair of coincident pulses. The output of the coincidence circuit is coupled through a delay stage 26 as a control input to coincidence gate 20 to enable the gate. When a scintillation is detected, the resulting coincident pulses from the photomultiplier tubes are summed by summation circuit 16 and thereafter analyzed by pulse height analyzer 18. If the pulse is within the desired window settings, it is presented to the coincidence gate 20 to be passed to scaler 22. Simultaneously, coincidence circuit 24 detects the occurrence of the same coincident pulses and provides an output control signal to the coincidence gate 20 which enables the gate to pass the pulse to the scaler for counting. Pulse processing by analyzer 18 takes a finite time and delay stage 26 delays the control signal from coincidence circuit 24 a corresponding time interval so that the sample pulse and the control signal are received simultaneously by the coincidence gate.

Figure 3:
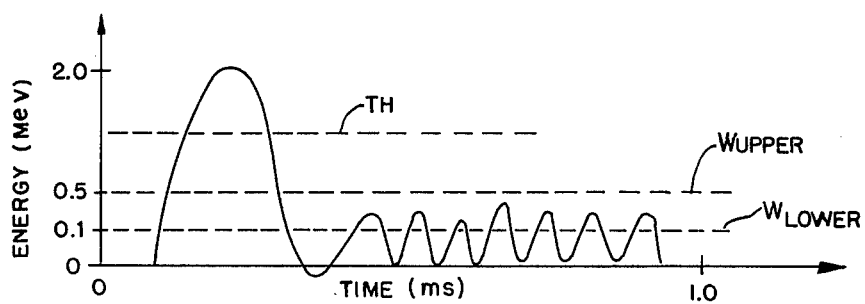
FIG. 3 is a graphical representation of an overloading energy surge plotted as a function of time and illustrates the initial high energy pulse and the subsequent lower energy satelite pulses of the surge.

As previously pointed out, overloading radiation surges can generate background radiation pulses which are measured as legitimate pulses and which thus substantially decrease the accuracy of the sample measurement. FIG. 3 is a plot of energy (MeV) vs. time and illustrates the form of a typical overloading surge from a cosmic source. The upper and lower limits of the energy window set by pulse height analyzer 18 for counting sample pulses are illustrated by respective dashed lines $W_{UPPER}$ and $W_{LOWER}$ in the figure. Typical energy values for $W_{UPPER}$ and $W_{LOWER}$ are 0.5 MeV and 0.1 MeV, respectively. The overloading surge comprises an initial high energy pulse having a pulse height substantially greater than the pulses being measured by the system. For example, the surge pulse height may be 2 MeV or more. The initial high energy pulse of the surge is followed by a stream of ringing or satellite pulses having lower pulse heights. In fact, the pulse heights of the satellite pulses typically fall within the window settings $W_{UPPER}$ and $W_{LOWER}$ of the radiation being measured, and for this reason are detected mistakenly as true sample pulses. The overloading energy surge may last for up to 1 millisecond and as many as 60 or more such surges may occur in 1 minute. However, the number of such surges is unpredictable as are the number of satellite pulses which occur for each surge.

Figure 2:
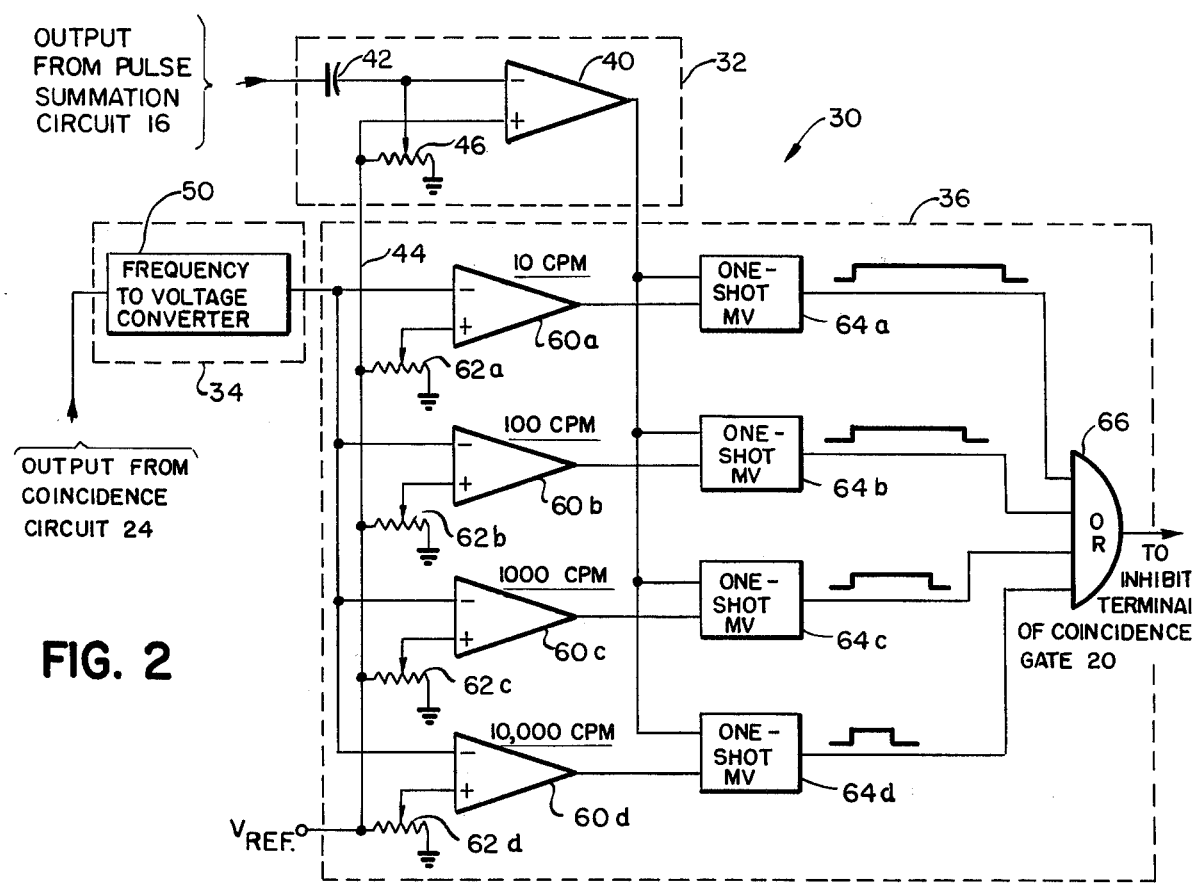
FIG. 2 is a schematic diagram of the variable inhibit circuit of FIG. 1.

In accordance with a primary aspect of the present invention, a variable inhibit circuit 30 (FIG. 1) is provided for inhibiting the measurement of pulses upon the occurrence of a radiation surge exceeding a predetermined energy level for a time period which varies inversely with the sample count rate. For this purpose the variable inhibit circuit 30, as illustrated in detail in FIG. 2, includes means 32 for detecting the occurrence of an overloading radiation surge, means 34 for monitoring the pulse rate of legitimate sample generated pulses, and means 36 for generating an inhibit signal for application to coincidence gate 20 to inhibit the measurement of radiation for a period varying inversely with the sample pulse rate.

Surge detector means 32 comprises an operational amplifier 40 having first and second input terminals and an output terminal. The first input terminal is coupled through coupling capacitor 42 to the output terminal of pulse summation circuit 16 and the second input terminal is coupled over line 44 to a source of reference voltage $V_{REF}$. The voltage level at the first input terminal of amplifier 40 is adjusted by potentiometer 46 connected between the source of reference voltage and ground. Amplifier 40 is biased so that for all detected pulses below a predetermined threshold energy level TH (see FIG. 3), the amplifier output is zero. Threshold level TH is set at a value which exceeds the upper window limit $W_{UPPER}$ of the sample counting window but which is less than the level of the overloading surges. When a pulse input exceeding the threshold level TH is received from pulse summation circuit 16 at the first input terminal of amplifier 40, thereby indicating the presence of an overloading radiation surge, the amplifier output terminal is driven positive. Thus, the output signal from amplifier 40 changes state to supply an overload signal upon the occurrence of an overloading surge greater than threshold level TH.

The pulse rate monitoring means 34 comprises a frequency to voltage converter 50 of conventional design which has an input terminal coupled to receive the pulse output from coincidence circuit 24 and a output terminal for supplying an analog voltage signal having a level related to the frequency of the pulses received by the converter. The analog voltage level thus corresponds to the frequency of detected coincident pulses. Assuming that the scintillation counter is adapted to count pulses from zero to 10,000 counts per minute, the analog voltage output signal from converter 50 could have representative values, for example, of 5, 4, 3, and 2 volts for respective pulse rates of 10, 100, 1,000, and 10,000 c.p.m.

The inhibit means 36 comprises a plurality of operational amplifiers 60a, 60b, 60c, and 60d each having a first input terminal thereof coupled to the output terminal of frequency to voltage converter 50 for receiving the analog voltage output signal therefrom. The amplifiers are biased as comparators and have second input terminals coupled to the adjustable slider of respective potentiometers 62a-62d coupled between the source of reference voltage $V_{REF}$ and ground. The input voltage at the second input terminal of each amplifier is adjusted so that the output terminal of each amplifier will be selectively driven from a zero to a positive level for different values of the analog pulse rate signal coupled to the first input terminal of each amplifier. Thus, for example, comparator amplifiers 60a, b, c, and d may be biased to supply positive output signals at respective analog input voltage levels from converter 50 of 5, 4, 3, and 2 volts.

If the analog voltage from converter 50 is 5 volts, representing a count rate of 10 c.p.m. in the above example, all amplifiers 60a-60d are switched on to provide a positive signal at the output terminal of each. If the analog voltage drops to 4 volts, indicating a pulse rate of 1,000 c.p.m., the output of amplifier 60a returns to zero while the output of amplifiers 60b-60d remains positive. When the voltage drops to 3 volts, indicating a pulse rate of 100 c.p.m., the output of amplifier 60a remains zero, the output of amplifier 60b switches to zero, and the output of amplifiers 60c and 60d remain positive. Finally, when the voltage drops to 2 volts, indicating a pulse rate of 10,000 c.p.m., the output of amplifiers 60a and 60b remains zero, the output of amplifier 60c switches to zero, and only amplifier 60d provides a positive output signal.

Inhibit means 36 further comprises a plurality of timing means, illustrated as conventional edge-triggered one-shot multivibrators 64a-64d associated, one each, with corresponding comparator amplifiers 60a-60d. The output terminal of each amplifier 60 is connected to one input terminal of its associated multivibrator. The second input terminal of each multivibrator is connected to the output terminal of the overload detector comparator amplifier 40.

Multivibrators 64a-64d are adapted to provide an output pulse of predetermined duration when the input terminals thereof both receive positive input signals. In this regard, the positive output signal from any or all of amplifiers 60a-60d when supplied to the one input terminal of the corresponding multivibrators 64a-64d conditions the respective multivibrators to generate an output pulse upon receipt of a trigger or strobe pulse at the second input terminal from the overload detector amplifier 40. As "edge-triggered" multivibrators, the leading edge of the trigger pulse triggers the multivibrator. Significantly, multivibrators 60a-60d have respectively decreasing time constants, so that the output pulse duration is greatest from multivibrator 60a and is shortest from multivibrator 60d as illustrated diagrammatically (not to scale) in FIG. 2 by the decreasing width multivibrator output pulse.

The output terminals of the respective multivibrators are coupled as parallel inputs to OR gate 66, the output terminal of which is coupled to coincidence gate 20 to control transmission of pulses therethrough between pulse height analyzer 18 and scaler 22. Thus, an inhibit pulse from the appropriate multivibrator 64 is coupled through OR gate 66 to coincidence gate 20 and inhibits the coincidence gate for the duration of the inhibit pulse and hence inhibits the counting of pulses by scaler 22 for the duration of the inhibit pulse.

In operation, the analog output signal from frequency to voltage converter 50, indicative of the pulse rate, drives the output of one or more comparator amplifiers 60a-60d positive to condition the associated multivibrator(s) 64a-64d. When an overloading energy surge occurs, the initial large pulse of the surge is detected by comparator amplifier 40 and the output of the amplifier supplies a positive trigger signal to the first input terminal of each multivibrator 64a-64d which triggers each conditioned multivibrator to generate an output pulse which is supplied through OR gate 66 as an inhibit signal to coincidence gate 20 for inhibiting the coincidence gate for the duration of the pulses and thereby inhibit counting of pulses by scaler 22. In the previous example, at the lowest count rate of 10 c.p.m., an inhibit pulse is generated by each multivibrator 64a-64d. Since each inhibit pulse is passed by OR gate 66, the coincidence gate 22 is inhibited for the duration of the largest pulse, namely the pulse from multivibrator 64a. At 100 c.p.m., no inhibit pulse is generated by multivibrator 64a, so the pulse of multivibrator 64b is the longest and thus the controlling pulse. Similarly, at 1,000 c.p.m., the pulse from multivibrator 64c controls while at 10,000 c.p.m., that from multivibrator 64d controls. For the count rate example previously given, the width of the corresponding output pulses from multivibrators 64a-64d may be $10^{-3}$ sec., $10^{-4}$ sec., $10^{-5}$ sec., and $10^{-6}$ sec., respectively. For these values, and assuming a rate of 60 overloading surges per minute, the maximum loss of legitimate pulses from sample 10 during the inhibit intervals is calculated to be less than 1 percent.

From the above it is apparent that the present invention provides a nuclear radiation measuring system which minimizes counting errors from overloading energy surges in a novel and unique manner. This is accomplished by inhibiting the counting of pulses for a time period which varies inversely with the pulse rate of a sample being counted. In this manner, the inhibit interval is maximized at low count rates where radiation surges introduce major inaccuracies and is minimized at higher count rates where the inaccuracies introduced by the surge are less. The invention has been described and illustrated in a scintillation counter of the coincidence type which, in a liquid scintillation counter, typically counts beta radiation. However, it should be understood that the invention can be incorporated in other counting arrangements having only single detectors for counting gamma or other radiation. Moreover, the invention may be employed in numerous types of counters where overloading surges pose problems, such as in well-logging counters, conventional hand-held counters for industrial applications, and the like. Moreover, it will be apparent that while a preferred embodiment of the invention has been illustrated and described, various modifications may be made therein without departing from the spirit and scope of the invention as defined by the appended claims.

What is claimed is:

1. A method of inhibiting a measurement of radiation following an overloading radiation surge in a nuclear radiation measuring system which includes apparatus for detecting nuclear radiation and converting same into pulses and for counting the pulses to provide a measure of the nuclear radiation, the method comprising the steps of:
    ascertaining the rate at which the pulses are generated;
    detecting the occurrence of a radiation surge exceeding a predetermined energy level; and
    inhibiting the counting of pulses upon the occurrence of the radiation surge for a time period which varies inversely with the ascertained pulse rate.

2. In a system for measuring nuclear radiation which includes detector means responsive to the nuclear radiation for converting the same into pulses and counting means coupled to the detector means for counting the pulses to provide a measure of the nuclear radiation, apparatus for inhibiting measurement of pulses upon the occurrence of an overloading radiation surge comprising:
    means for generating a pulse rate signal indicative of the rate at which pulses are produced by the detector means;
    surge detector means for detecting the occurrence of a radiation surge exceeding a predetermined energy level and for generating an overload signal in responses thereto; and
    means for inhibiting counting of pulses for a time period which varies inversely with the pulse rate, said latter means being responsive to the pulse rate signal and to the overload signal.

3. The system of claim 2 including gating means coupled between said detector means and said counting means for transferring pulses to said counting means, and wherein said means for inhibiting includes timing means for generating an inhibit pulse signal having a duration which varies inversely with said pulse rate, and means for coupling said inhibit pulse signal to said gating means to inhibit said gating means.

4. A system of claim 3 wherein said means for inhibiting further includes comparator means for comparing said pulse rate signal to a reference signal and for supplying an output control signal related to said pulse rate signal, said timing means including an inhibit pulse generator having a first input terminal receiving said output control signal and a second input terminal receiving said overload signal and being responsive to the presence of both signals for generating said inhibit pulse signal.

5. The system of claim 4 wherein said means for generating a pulse rate signal comprises a frequency to voltage converter for generating an analog signal indicative of the rate at which pulses are produced by the detector means, wherein said comparator means comprises a plurality of comparators having first input terminals connected to said frequency to voltage converter to receive the analog signal therefrom and having second input terminals connected to adjustable voltage sources for adjusting each comparator to supply a respective output control signal, and wherein said timing means comprises a plurality of said inhibit pulse generators associated one each with said comparators for receiving said respective output control signals from said comparators at first input terminals thereof, said plurality of inhibit pulse generators further receiving said overload signal at second input terminals thereof.

6. The system of claim 5 wherein said inhibit pulse generators are multivibrators.

* * * * *